United States Patent [19]
Sauli

[11] 3,922,281
[45] Nov. 25, 1975

[54] PROCESS FOR THE PREPARATION OF 3-(O,O-DIETHYLDITHIOPHOSPHORYLMETHYL)-6-CHLORO-BENZOXAZOLONE

[75] Inventor: Michel Sauli, Paris, France

[73] Assignee: Rhone-Poulenc, S.A., Paris, France

[22] Filed: June 26, 1974

[21] Appl. No.: 483,421

[30] Foreign Application Priority Data
June 28, 1973  France .............................. 73.23660

[52] U.S. Cl. ............................................. 260/307 C
[51] Int. Cl.² ...................................... C07D 263/58
[58] Field of Search ................................ 260/307 C

[56] References Cited
FOREIGN PATENTS OR APPLICATIONS
1,196,456  6/1970  United Kingdom Primary Examiner—Raymond V. Rush
Attorney, Agent, or Firm—Stevens, Davis, Miller & Mosher

[57] ABSTRACT

3-(O,O-Diethyldithiophosphorylmethyl)-6-chlorobenzoxazolone (known as "phosalone"), which possesses insecticidal and acaricidal properties, is prepared by a new process which comprises condensing an alkali metal or the ammonium salt of O,O-diethyldithiophosphoric acid, formaldehyde and 6-chlorobenzoxazolone in the presence of methanesulphonic acid.

5 Claims, No Drawings

PROCESS FOR THE PREPARATION OF 3-(O,O-DIETHYLDITHIOPHOSPHORYLMETHYL)-6-CHLORO-BENZOXAZOLONE

The present invention relates to a process for the preparation of 3-(O,O-diethyldithiophosphorylmethyl)-6-chloro-benzoxazolone (known as "phosalone") of the formula:

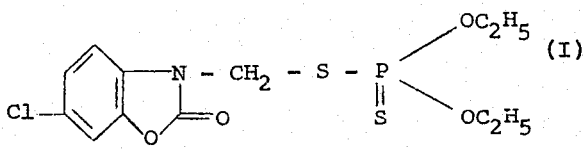

Phosalone possesses remarkable insecticidal and acaricidal properties which have been described in particular by J. Desmoras and colleagues, Phytratie Phytopharmacie, 12, 199 (1963).

Phosalone can be prepared in accordance with the processes which are described in the specification of British Patent No. 1005372, granted to Rhone Poulenc S.A. on an application filed on Oct. 9, 1961, and more particulary by reacting the potassium salt of O,O-diethyldithiophosphoric acid with 3-chloromethyl-6-chloro-benzoxazolone.

The specification of British Patent No. 1196456, granted to Agripat S.A. on an application filed on July 4, 1967, states, furthermore, that it is possible to prepare heterocyclic dithiophosphoric acid esters either in a single step by condensing an alkali metal salt or the ammonium salt of O,O-diethyldithiophosphoric acid with formaldehyde and an appropriate nitrogen-containing heterocyclic compound, in the presence of a strong non-oxidising inorganic acid, or in two steps, the first of which consists of preparing the N-hydroxymethylated derivative of the nitrogen-containing heterocyclic compound by the action of formaldehyde, and the second step of reacting the product obtained with O,O-diethyldithiophosphoric acid in the presence of a strong non-oxidising inorganic acid. However, when the nitrogen-containing heterocyclic compound is 6-chloro-benzoxazolone, experience shows that if the reaction is carried out in a single step and under the working conditions indicated in British Patent Specification No. 1196456, the expected phosalone is not obtained.

It has now been found, and it is this which forms the subject of the present invention, that phosalone can be prepared in a single step and in good yields by condensing an alkali metal salt or the ammonium salt of O,O-diethyldithiophosphoric acid, formaldehyde and 6-chlorobenzoxazolone, in the presence of methanesulphonic acid.

The reaction is preferably carried out in pure methanesulphonic acid as solvent, but methanesulphonic acid in the presence of water can also be used.

The condensation temperature is generally from 0° to 25°C., and preferably from 5° to 20°C.

It is particularly advantageous to use formaldehyde either in aqueous solution or in solid polymerised form (paraformaldehyde).

Phosalone prepared by the process of the present invention may optionally be purified by physical methods such as crystallisation or by physico-chemical methods such as chromatography.

Phosalone prepared by the process of the invention may be made up into insecticidal and acaricidal compositions by association with one or more diluents or adjuvants compatible with the phosalone and suitable for use in argicultural insecticidal and acaricidal compositions.

The following Examples illustrate the invention,

EXAMPLE 1

6-Chloro-benzoxazolone (23.7 g.) and paraformaldehyde (4.5 g.) are added successively to a suspension of ammonium O,O-diethyldithiophosphate (30.5 g.) in methanesulphonic acid (100 cc.) kept at between 5° and 10°C. The mixture is stirred for 6 hours at 10°C. and then for (12 hours at 20°C. The reaction mixture is poured into water (1,500 cc.) and the resultant mixture is extracted twice with diethyl ether (total 400 cc.). The combined organic layers are washed successively three times with an aqueous solution of sodium hydroxide (40 g./liter: total 600 cc.) and then with water (200 cc.). After drying over sodium sulphate, the diethyl ether is evaporated under reduced pressure and the residue obtained is recrystallised from ethanol (35 cc.). 3-(O,O-Diethyldithiophosphorylmethyl)-6-chloro-benzoxazolone (37 g.), which melts at 47°C., is thus obtained.

EXAMPLE 2

6-Chloro-benzoxazolone (23.7 g.) is added to a suspension of ammonium O,O-diethyldithiophosphate (28 g.) in methanesulphonic acid (100 cc.) kept at 10°C. The mixture is cooled to about 5°C. and an aqueous solution (13.5 g.) containing 30% w/v of formaldehyde is added dropwise over the course of 30 minutes whilst keeping the temperature at 5°C. Stirring is continued for 5 hours at 5°C. and then for 12 hours at 20°C., and thereafter the mixture is heated at 50°C. for 30 minutes. The reaction mixture is poured into water (1,000 cc.). The resultant mixture is extracted twice with diethyl ether (total 400 cc.). The combined organic layers are washed successively with an aqueous solution of sodium hydroxide (40 g./liter: 250 cc.) and water (200 cc.). After drying over sodium sulphate, the diethyl ether is evaporated under reduced pressure. 3-(O,O-Diethyldithiophosphorylmethyl)-6-chloro-benzoxazolone (47 g.), which melts at 45°–46°C., is thus obtained.

I claim:
1. Process for the preparation of 3-(O,O-diethyldithiophosphorylmethyl)-6-chloro-benzoxazolone which comprises condensing an alkali metal or the ammonium salt of O,O-diethyldithiophosphoric acid, formaldehyde and 6-chloro-benzoxazolone in a single step in the presence of methanesulphonic acid and at 0° to 25°C.
2. Process according to claim 1 in which the process is carried out in methanesulphonic acid as solvent.
3. Process according to claim 1 in which an aqueous solution of formaldehyde is used.
4. Process according to claim 1 in which solid polymerised formaldehyde is used.
5. Process according to claim 1 in which the process is carried out at from 5° to 20°C.

* * * * *